Figure 9:
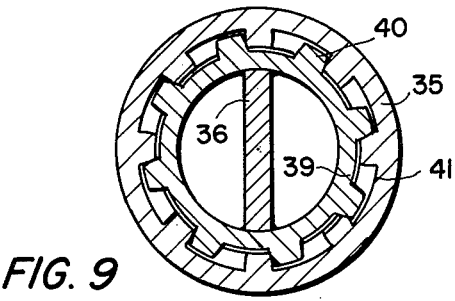

May 5, 1964
H. HORNSCHUCH ETAL
3,131,554
IMPACT TOOL TORQUE LIMITING MEANS
Filed Jan. 3, 1962
2 Sheets-Sheet 1
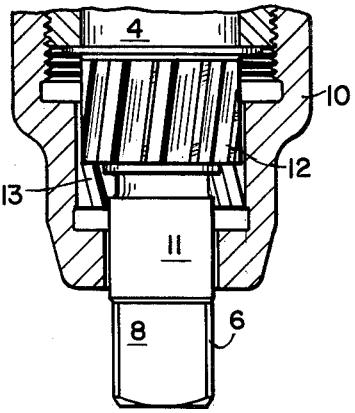
FIG. 5
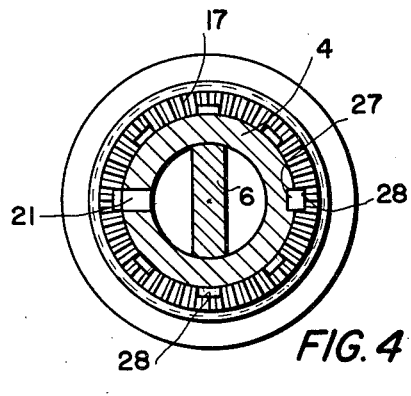
FIG. 4
FIG. 3
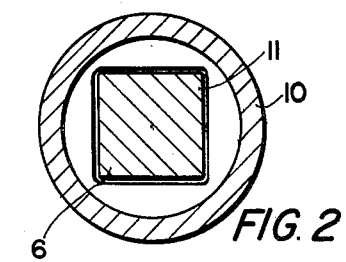
FIG. 2
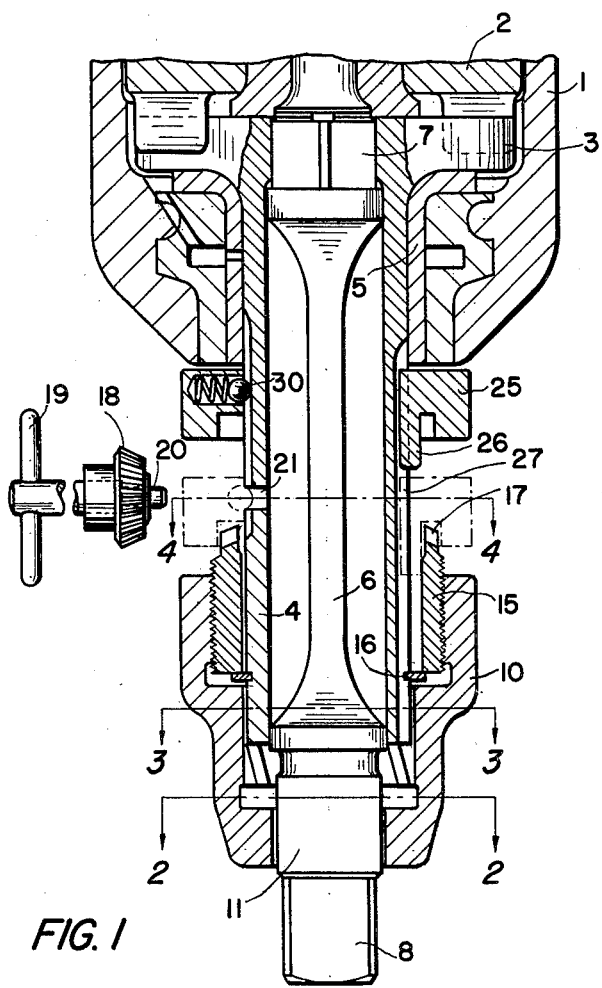
FIG. 1
INVENTORS
HANNS HORNSCHUCH
HAROLD C. REYNOLDS
BY
David W. Tibbott
THEIR ATTORNEY May 5, 1964     H. HORNSCHUCH ETAL     3,131,554
IMPACT TOOL TORQUE LIMITING MEANS Filed Jan. 3, 1962     2 Sheets-Sheet 2

INVENTORS
HANNS HORNSCHUCH
HAROLD C. REYNOLDS
BY
David W. Tibbetts
THEIR ATTORNEY United States Patent Office 3,131,554
Patented May 5, 1964

3,131,554
IMPACT TOOL TORQUE LIMITING MEANS
Hanns Hornschuch, Easton, and Harold C. Reynolds, Athens, Pa., assignors to Ingersoll-Rand Company, New York, N.Y., a corporation of New Jersey
Filed Jan. 3, 1962, Ser. No. 164,071
4 Claims. (Cl. 64—27)

This invention relates to rotary impact tools having torque limiting means which can be adjusted to vary the maximum magnitude or amount of torque applicable by such tools to a workpiece, such as a nut or the like.

A conventional rotary impact tool having an adjustable torque limiting means is disclosed by the U.S. Patent No. 2,822,677, issued February 11, 1958, to H. C. Reynolds. This tool includes an axially extending torsion spring or bar which is utilized to transmit rotary impacts to a workpiece. The torsion spring is wound or prestressed to a predetermined value of torque corresponding to the maximum torque load that is to be transmitted by the torsion spring to a workpiece. By being prestressed, the torsion spring transmits torque loads as a rigid non-deflecting coupling so long as the transmitted torque is equal to or less than the prestressed torque of the torsion spring. When the impact torque load applied to the torsion spring by the rotary impact tool exceeds the prestressed torque of the torsion spring, the torsion springs begins acting as a spring, instead of a rigid coupling, and deflects an additional amount and then rebounds to absorb and dissipate the excessive impact torque load without transmitting it to the workpiece.

The above described arrangement does a fine job in limiting the maximum torque output of a rotary impact tool. However, its attractiveness is lessened by the fact that the torsion spring is difficult to adjust to selected values of prestressed torque and such adjustment requires a special jig or other complicated apparatus.

The principal object of this invention is to overcome and substantially eliminate the problems present in the above described conventional torque limiting means and to provide an impact tool torque limiting arrangement which can be readily and simply adjusted without utilizing special jigs or similar types of devices.

Other objects of this invention are: to provide an improved torque limiting means for a rotary impact tool; to provide a torque limiting means of the prestressed torsion spring type which automatically locks the torsion spring against unwinding; and to provide a rotary impact tool torque limiting means which can be arranged for adjustment by using the hand alone or arranged for adjustment using conventional tools such as a wrench or drill chuck key.

Briefly, the objects of this invention are accomplished by fixing the rear end of the torsion spring to the rotary anvil of the impact tool, thus preventing rotation therebetween, by connecting the front end portion of the torsion spring to the anvil by an adjustment member which is joined to both the anvil and to the torsion spring by separate slidable keyed joints and by arranging at least one of the slidable keyed joints to include a set of interengaged helical splines and grooves which are inclined relative to the axis of the torsion spring so that the front end of the torsion spring is wound, relative to its rear end, as the adjustment member is moved axially rearwardly on the torsion spring and the anvil.

Threaded means is provided for moving the adjustment member rearwardly on the torsion spring. This threaded means may be arranged to be manipulated by the hand alone, or a wrench or a drill chuck key.

Figure 7:
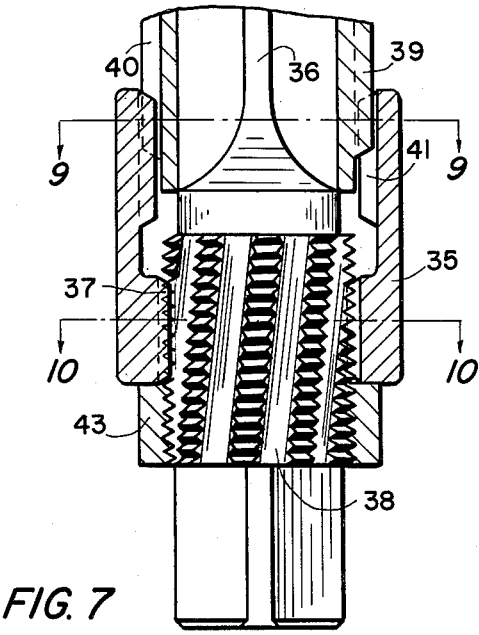
Figure 6:
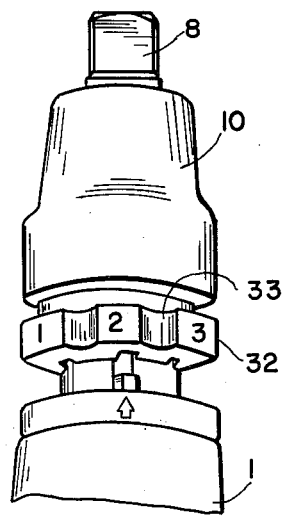
Figure 8:
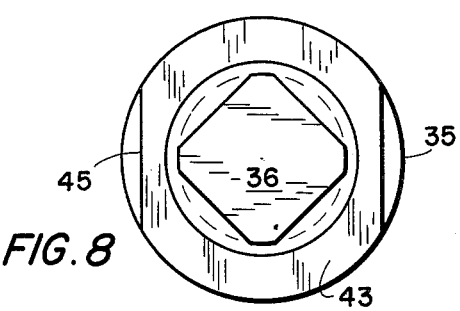
Figure 10:
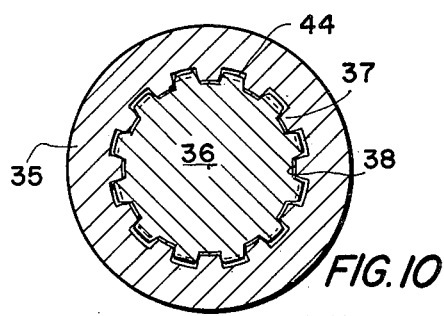

The invention is illustrated in the accompanying drawings wherein:

FIG. 1 is a longitudinal sectional view of the front portion of a rotary impact tool containing an adjustable torque limiting means constructed in accordance with this invention;

FIG. 2 is a section taken on line 2—2 of FIG. 1;
FIG. 3 is a section taken on line 3—3 of FIG. 1;
FIG. 4 is a section taken on line 4—4 of FIG. 1;
FIG. 5 is a fragmentary view of the lower portion of FIG. 1 with the lower end of the anvil being shown in elevation to illustrate the helical splines and grooves interconnecting the anvil and the torque limiting adjustment barrel;
FIG. 6 is an elevational view of a modified embodiment;
FIG. 7 is a longitudinal section of a third embodiment of the invention;
FIG. 8 is a bottom plan view of FIG. 7;
FIG. 9 is a section taken on line 9—9 of FIG. 7; and
FIG. 10 is a section taken on line 10—10 of FIG. 7.

The rotary impact tool embodiment shown in FIGS. 1 to 5 includes an outer housing or casing 1 containing a rotary motor (not shown) driving a rotary hammer 2 which, as it rotates, periodically strikes an impact or blow to a rotary anvil 3. The anvil 3 includes an integral forwardly extending tubular portion 4 journaled in a bearing 5 mounted in the front end of the impact tool housing 1. The tubular portion 4 of the anvil surrounds an elongated torsion spring or bar 6 having its rear end 7 formed as a square plug non-rotationally seated in a corresponding square hole in the anvil 3, so that the impacts received by the anvil 3 from the hammer 2 are rigidly coupled to the upper end of the torsion spring 6.

The forward end 8 of the torsion spring 6 is adapted to engage a workpiece, such as a nut or bolt head. This engagement is accomplished by means of a socket (not shown) having a square hole for detachably receiving the square forward drive end 8 of the spring 6. The foregoing structure is conventional in the rotary impact tool art.

The impact energy received by the anvil 3 is transmitted by the torsion spring 6 to a workpiece. In order for the spring 6 to accomplish this, it must be wound or prestressed under a torque which is equal to or greater than the torque of the impacts being transmitted. Once the spring 6 is wound under a given torque load, it acts as a rigid coupling in transmitting torque loads which are equal to or less than the prestressing torque of the spring. In other words, so long as the torque loads applied to the torsion spring 6 do not exceed its prestressed torque, no further deflection of the spring 6 occurs.

The torque load applied by the anvil 3 to the torsion spring 6 is determined by the resistance of the workpiece to a rotary movement. If the workpiece is free to turn under low values of torque, the torque load on the torsion spring 6 is low. As the resistance of the workpiece to rotary movement increases, as it is tightened, the torque load on the torsion spring 6 progressively rises in a corresponding manner until either reaching the maximum impact torque applicable by the hammer 2 to the anvil 3, or exceeding the prestressed torque of the torsion spring 6.

When the impact torque load applied to the torsion spring 6 exceeds its prestressing torque, the spring 6 deflects or winds up additionally under each impact and then rebounds, resulting in the impact being absorbed substantially by the spring 6 without transmitting it to the workpiece. Thus, the torsion spring 6 acts to limit the maximum torque applicable to a workpiece to a value of torque equaling substantially the prestressed torque of the spring 6.

This invention covers a means for winding up or prestressing the torsion spring 6. A barrel or adjustment member 10, shown in FIG. 1, is mounted on the front end portion of the torsion spring 6 to slide longitudinally along it and has a square bore at its lower end snugly fitting over a corresponding square section 11 of the torsion spring 6. Thus, the barrel 10 is non-rotationally joined or keyed to the section 11 of the spring 6.

The barrel 10 is joined to the front end portion of the anvil tubular portion 4 by means of a series of interengaging helical splines 12 and grooves 13 which are inclined at about 10° to the longitudinal axis of the spring 6. These splines 12 and grooves 13 are shown in FIG. 5. The splines 12 are integrally formed on the circumference of a portion of the anvil tubular portion 4 and the grooves 13 are cut in the interior of the barrel 10. The helical incline of the splines 12 and grooves 13 causes the barrel 10 to progressively rotative relative to the anvil portion 4 as the barrel 10 slides axially along the torsion spring 6 and the anvil portion 4.

FIG. 3 shows a cross-section of the splines 12 and grooves 13. The splines 12 are substantially narrower than the grooves 13 to provide a sufficient amount of play or lost motion for the torsion spring 6 to deflect when the applied torque load exceeds its prestressing torque. The incline or taper of 10° of the splines 12 and grooves 13 is a sufficiently small angle so that the frictional engagement between the splines and grooves is high enough to prevent the prestressed torque on the torsion spring 6 from causing relative movement between the splines and grooves. Hence, as the torsion spring is wound by moving the barrel 10 rearwardly on the anvil tubular portion 4, the splines and grooves are self-locking to prevent the spring from unwinding.

The barrel 10 is moved rearwardly on the spring 6 and the anvil tubular portion 4 by means of an externally threaded collar 15 rotating on the anvil tubular portion 4 and engaging corresponding internal threads on the interior of the barrel 10. The pitch on the threads between the collar 15 and barrel 10 is sufficiently small to provide a large mechanical advantage whereby the collar 15 can be turned fairly easily in prestressing the torsion spring 6. For example, these threads may have a pitch corresponding to 20 threads per inch. The front end of the collar 15 abuts a snap ring 16 which fits in a corresponding annular groove in the anvil tubular portion 4 and holds the collar 15 against sliding axially forward on the anvil portion 4 during the adjustment of the barrel 10.

In the embodiment shown in FIGS. 1 to 5, the collar 15 is provided at its rear end with a series of beveled gear teeth 17 adapted to engage the teeth 18 of a conventional Jacobs drill chuck key 19, which is manipulated to rotate the collar 15 in the same manner that it is used on the conventional Jacobs drill chuck. During this adjustment of the collar 15, the axle pin 20 of the chuck key 19 seats in the radially opening hole 21 formed in the anvil tubular portion 4.

Means is provided for holding the collar 15 in its adjusted position on the anvil tubular portion 4 during the use of the impact tool. This means includes a latch ring 25 slidably mounted on the anvil tubular portion 4 rearwardly of the collar 15 and having an integral key 26 seating in a longitudinal keyway or kerf 27 cut in the exterior of the anvil portion 4. The keyed engagement between the latch ring 25 and the anvil portion 4 prevents relative rotation therebetween.

The key 26 projects forwardly of the ring 25 and is adapted to enter one of a series of angularly spaced slots 28 formed in the end face of the collar 15. The slots 28 open rearwardly in the beveled gear teeth 17 on the collar 15 as shown in FIG. 4. After the collar 15 is adjusted to wind the torsion spring 6 to a selected prestress using the chuck key 19, the collar 15 is further turned until the nearest slot 28 in the collar 15 is radially aligned with the kerf 27 in the anvil tubular portion 4, the chuck key 19 is then withdrawn and the latch ring 25 is moved axially forward to seat its key 26 in the radially aligned slot 28.

The latch ring 25 is provided with a spring pressed detent ball 30 which seats in the radial hole 21 in the anvil tubular portion 4 to hold the latch ring 25 in its forward latching position, as shown in dotted lines in FIG. 1.

It should be recognized that the foregoing embodiment is useful for winding the torsion spring in only one rotary direction. For example, if a nut is to be driven in a clockwise direction, the forward end of the spring 6 should be wound in a counter clockwise direction relative to its rear end. Of course, the inclined helical splines 12 and grooves 13 are inclined in the proper direction to wind the spring 6 in the desired rotary direction.

Since the splines 12 and grooves 13 are self-locking, the spring 6 is unwound by screwing the collar 15 rearwardly from the barrel 10 the necessary distance and then applying a reverse torque to the torsion spring 6, such as by operating the tool in reverse, to release the splines 12 from the grooves 13 and allow the spring 6 to unwind the desired amount.

The embodiment shown in FIG. 6 differs from the previous embodiment by having the rear end of the adjusting collar formed with an enlarged diameter annular ridge 32 in place of the beveled gear teeth 17 shown in the FIG. 1 embodiment. The annular ridge 32 is formed with cut-outs 33 in its circumference adapting it to be grasped by an operator's hand for turning the collar 15. Hence, the only difference between the embodiments shown in FIGS. 1 and 6 is that the FIG. 1 embodiment is adjusted by a drill chuck key 19 while the FIG. 6 embodiment is adjusted by using the human hand alone, without using any keys 19.

The third embodiment shown in FIGS. 7 to 10 is quite different from the two previous embodiments. In this embodiment, the barrel 35 is interconnected to the front end portion of the torsion spring 36 by means of a series of interengaged helical splines 37 and grooves 38 which are inclined relative to the axis of the torsion spring 36 to serve the same purpose as the inclined splines 12 and grooves 13 found in the earlier embodiments.

FIG. 7 shows the inclined splines 37 integrally formed on the interior of the barrel 35 and the inclined grooves 38 formed on the circumference of a forward section of the torsion spring 36. As shown in FIG. 10, the splines 37 and 38 are snugly engaged so that little or no lost motion or play occurs therebetween.

The rear end of the barrel 35 is non-rotatably connected to the anvil tubular portion 39 by means of a series of interengaged straight splines 40 and grooves 41. As shown in FIG. 9, the splines 40 are integrally formed on the outer circumference of the anvil tubular portion 39 and the grooves 41 are formed in the interior of the barrel 35. Lost motion or play is provided between the anvil portion 39 and the barrel 35 by forming the splines 40 narrower than the grooves 41 to allow sufficient clearance therebetween, whereby the torsion spring 36 can deflect or wind-up further when the torque load applied to it exceeds its prestressed torque.

The barrel 35 is moved axially rearwardly on the torsion spring 36 by a nut 43 threaded on the lands 44 of the circumference of the torsion spring 36 between the helical grooves 38 formed in the torsion spring 36. The nut 43 is turned by means of a suitable wrench (not shown) engaging the flats 45 formed on the circumference of the nut 43, as shown in FIG. 8.

While in accordance with the patent statutes several preferred embodiments of the present invention have been illustrated and described in detail, it is to be particularly understood that the invention is not limited merely to these embodiments, but is only limited by the novel concepts of this invention.

Having described the invention, we claim:

1. In a rotary impact tool including a rotary anvil and a rotary hammer adapted to periodically strike the anvil, a coupling for transmitting the rotary hammer impacts from the anvil to a workpiece and limiting the maximum torque of the transmitted impacts to a selected predetermined value of torque which can be readily adjusted, said coupling comprising: a torsion spring having one end non-rotatably connected to said anvil and adapted to have its other end connected to a workpiece; an adjustment member comprising a barrel mounted on the other end of said torsion spring and surrounding said spring and said anvil; engagement means interconnecting said adjustment member to both said spring and to said anvil for allowing said member to slide longitudinally relative to said spring and anvil and for locking said adjustment member against rotation relative to said spring and anvil in at least one rotary direction, said engagement means including a set of interengaging helical splines and grooves extending at a substantial angle relative to the longitudinal axis of said torsion spring; means for forcing said adjustment member to slide longitudinally along said spring to cause said helical splines to slide along said helical grooves for rotating the opposite ends of said spring relative to each other and winding the spring to a prestressed torque, said means for forcing said adjustment member axially along said spring including an externally threaded collar rotatably mounted on said anvil and engaging internal threads on said barrel; and means for preventing said collar from sliding axially forward on said anvil during the adjustment of said barrel.

2. The impact tool of claim 1 wherein said threaded collar is provided with gear teeth adapted to engage a drill chuck key for rotating the collar on said anvil.

3. The impact tool of claim 1 wherein said threaded collar is provided with surfaces adapted to be grasped in the human hand for rotating said collar.

4. In a rotary impact tool including a rotary anvil and a rotary hammer adapted to periodically strike the anvil, a coupling for transmitting the rotary hammer impacts from the anvil to a workpiece and limiting the maximum torque of the transmitted impacts to a selected predetermined value of torque which can be readily adjusted, said coupling comprising: a torsion spring having one end non-rotatably connected to said anvil and adapted to have its other end connected to a workpiece; an adjustment member mounted on the other end of said torsion spring; engagement means interconnecting said adjustment member to both said spring and to said anvil for allowing said member to slide longitudinally relative to said spring and anvil and for locking said adjustment member against rotation relative to said spring and anvil in at least one rotary direction, said engagement means including a set of interengaging helical splines and grooves extending at a substantial angle relative to the longitudinal axis of said torsion spring; and means including a nut threaded on said spring in front of said adjustment member and engaging said adjustment member for forcing it to slide longitudinally along said spring to cause said helical splines to slide along said helical grooves for rotating the opposite ends of said spring relative to each other and winding the spring to a prestressed torque.

References Cited in the file of this patent
UNITED STATES PATENTS

| | | |
|---|---|---|
| 2,429,067 | McDonald | Oct. 14, 1947 |
| 2,822,677 | Reynolds | Feb. 11, 1958 |
| 3,020,775 | Musser | Feb. 13, 1962 |